United States Patent [19]

Fehlmann et al.

[11] Patent Number: 4,869,218
[45] Date of Patent: Sep. 26, 1989

[54] FUEL INJECTION PUMP FOR INTERNAL COMBUSTION ENGINES

[75] Inventors: Wolfgang Fehlmann, Stuttgart; Wolfgang Geiger, Remshalden-Grunbach, both of Fed. Rep. of Germany

[73] Assignee: Robert Bosch GmbH, Stuttgart, Fed. Rep. of Germany

[21] Appl. No.: 220,205

[22] Filed: Jul. 18, 1988

[30] Foreign Application Priority Data

Nov. 19, 1987 [DE] Fed. Rep. of Germany ....... 3739198

[51] Int. Cl.$^4$ ............................................. F02M 39/00
[52] U.S. Cl. ................................. 123/357; 123/41.31; 123/381; 165/80.2
[58] Field of Search ............... 123/381, 357, 358, 359, 123/41.31; 165/80

[56] References Cited

U.S. PATENT DOCUMENTS

| | | | |
|---|---|---|---|
| 4,084,564 | 4/1978 | Rickert | 123/41.31 |
| 4,364,355 | 1/1982 | Karino | 123/41.31 |
| 4,393,835 | 7/1983 | Eheim | 123/357 |
| 4,465,044 | 8/1984 | Yasuhara | 123/357 |
| 4,532,893 | 8/1985 | Day | 123/41.31 |
| 4,543,914 | 10/1985 | Harris | 123/357 |
| 4,732,546 | 3/1988 | Fehlmann | 123/357 |
| 4,763,611 | 8/1988 | Kobayashi | 123/41.31 |

FOREIGN PATENT DOCUMENTS

| | | | |
|---|---|---|---|
| 0133440 | 8/1983 | Japan | 123/381 |
| 0185839 | 10/1984 | Japan | 123/381 |

*Primary Examiner*—Carl Stuart Miller
*Attorney, Agent, or Firm*—Edwin E. Greigg

[57] ABSTRACT

A fuel injection pump for internal combustion engines, which has a pump interior and a control mechanism chamber separate from it, with a control mechanism for actuating a quantity adjusting device determining the fuel injection quantity, is provided with an electrical temperature sensor, to compensate for the effect of temperature on the metered fuel quantity. The output signal of the temperature sensor is included as a correction variable in the control variable for the control mechanism. To assure accurate temperature measurement without delay, and for easy access to the temperature sensor for servicing, the temperature sensor is disposed in the control mechanism chamber and, with a temperature-sensitive sensor element, preferably an NTC resistor, dips into a permanent fuel flow diverted from the pump interior. The electrical connecting lines of the temperature sensor are extended to a circuit board on which the connecting lines for the electric control mechanism are also located, in the control mechanism chamber and bonded thereto.

21 Claims, 8 Drawing Sheets

FUEL INJECTION PUMP FOR INTERNAL COMBUSTION ENGINES

BACKGROUND OF THE INVENTION

The invention is directed to improvements in a fuel injection pump for internal combustion engines.

In such fuel injection pumps, the quantity of fuel delivered per pump piston stroke to the injection nozzles and injected there into the cylinders of the engine is metered highly accurately by the electric control mechanism. However, it has been found that the metered fuel quantity depends decisively on the temperature of the fuel being pumped, and thus can fluctuate within relatively wide limits, so that an optimally metered fuel injection quantity is not reliably assured.

However, the temperature dependency of the fuel injection can easily be compensated for by measuring the instantaneous temperature of the fuel pumped by the pump piston from the pump interior and then including this measured value in the computation of the control variable supplied to the electric control mechanism to serve as a correction variable for actuation of the quantity adjusting device.

In a known fuel injection pump (German Offenlegungsschrift 29 29 176), the entire overflow quantity of approximately 30 liters per hour flows out of the pump interior via a fluid-carrying opening into the control mechanism chamber, from whence it flows via the overflow valve into the fuel return system and thus returns to the fuel tank, which is at atmospheric pressure. The pump interior and control mechanism chamber are subjected to a continuous flow through them, and so the fuel temperature in the two chambers is approximately the same. Since the fuel, especially Diesel fuel, usually contains relatively large proportions of water, water can get into the electrical parts of the control mechanism that carry voltage, and if the water remains there for very long it can corrode and destroy those parts.

To avoid this corrosion problem, the fluid-carrying opening in the fuel injection pump of the usual type initially referred to above is embodied as a throttle, having an opening cross section of only a few square micrometers. Thus only a very small fuel quantity, of about 30 cm$^3$ per hour, reaches the control mechanism chamber, and its water concentration is only 10% that of the fuel located in the pump interior. Since the low fuel inflow quantity causes virtually no turbulence in the fuel in the control mechanism chamber, the water settles to the bottom of the control mechanism chamber, where it cannot come into contact with currentcarrying parts of the electric control mechanism. In this fuel injection pump, no notable fuel flow takes place, even though the control mechanism is filled with fuel, and so the temperature of the fuel located in the control mechanism chamber is not a direct measure for the temperature of the fuel actually pumped out of the pump interior by the pump piston.

OBJECT AND SUMMARY OF THE INVENTION

It is a principal object of the fuel injection pump according to the invention to provide the advantage that on the one hand the temperature sensor is mounted where it is easily accessible and can easily be replaced during servicing, while on the other hand fast temperature detection is assured, and the detected temperature is equivalent to the actual temperature of the fuel quantity pumped by the pump piston. The diversion of a permanent fuel flow from the pump interior assures a continuous exchange of fuel at the sensor element of the temperature sensor, so that long-duration factors cannot make the fuel temperature that prevails there inaccurate. Since the fuel flow is drawn directly and continuously from the interior of the pump, the temperature of the fuel flow is equivalent to that of the fuel pumped from the pump interior into the pump work chamber for injection. Even rapid changes in temperature are thus reliably detected by the temperature sensor, and the control variable for the electric control mechanism for setting the quantity adjusting device takes these changes into account in such a way that changes, caused by changes in temperature, in the metered volumes of the quantities of fuel that attain injection are cancelled. The electrical connecting lines are disposed on the control mechanism chamber circuit or contact board, which is connected to a control unit via an electrical connection that extends through a fluid-tight duct in the pump housing, and so no further sealing from the outside needs to be provided.

Another object of the invention is to provide that the fuel flow for the temperature sensor can be obtained in various ways, for example, as in the several advantageous embodiments of the invention described below.

The invention will be better understood and further objects and advantages thereof will become more apparent from the ensuring detailed description of preferred embodiments taken in conjunction with the drawings.

DESCRIPTION OF THE PREFERRED EMBODIMENTS

Figure 1:
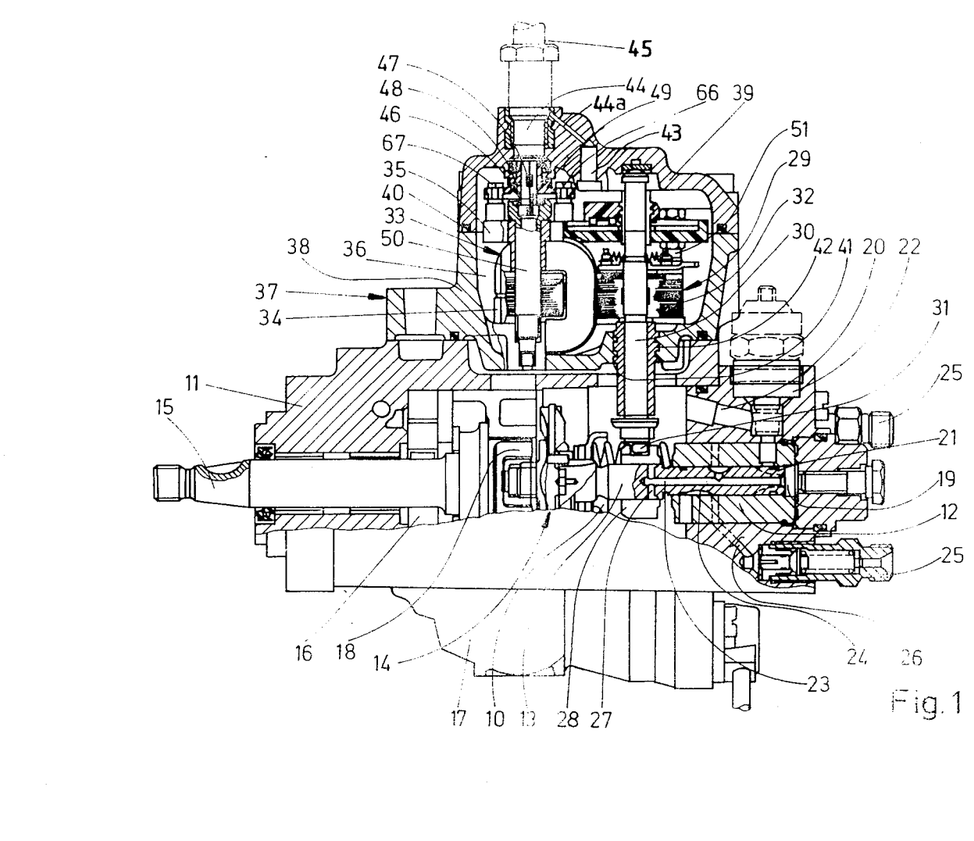
FIG. 1 is a longitudinal section taken through a fuel injection pump of the distributor type.

In the fuel injection pump of the distributor type for an internal combustion engine, shown in FIG. 1, a pump interior 10 is enclosed by a pump housing 11. Provided in the pump housing 11 in the usual manner is a pump cylinder 12, in which a distributor piston 13 is guided. The distributor piston 13 is set into rotational and reciprocating motion by a cam drive 14 and a drive shaft 15. At the same time, the drive shaft 15 drives a feed pump 16, which pumps fuel from a fuel tank into the pump interior 10 via a feed line, not shown. The pressure in the pump interior is determined by a pressure control valve, not shown, which controls the pressure as a function of rpm, so that the pressure increases with increasing rpm. This change in pressure is converted by a hydraulic pressure adjuster 17 into a rotational movement of a roller ring 18 of the cam drive 14 in a manner known per se and thereby shifts the injection onset of the fuel injection pump toward "early" as the rpm increases.

On its face end, the distributor piston 13 defines a pump work chamber or high-pressure chamber 19 in the pump cylinder 12. This chamber is supplied with fuel from the pump interior 10 during the downward stroke of the distributor piston 13 via a suction conduit 20 and a longitudinal groove 21 disposed in the jacket face of the distributor piston 13. The suction conduit 20 is controlled by a magnetic valve 22, which is closed when it is without current. During the compression stroke of the distributor piston 13, or in other words during its upward movement, the fuel then flows from the high-pressure chamber 19 via a central bore 23 to a distributor groove 24, which in successive compression strokes successively opens pressure lines 26 leading to injection nozzles 25. The central bore 23 discharges into a radial control bore 27, which after a certain length of stroke has been executed emerges from a control slide 28 and thus establishes communication between the high-pressure chamber 19 and the pump interior 10, as a result of which the fuel injection is terminated by the distributor piston 13. The control slide 28 thus defines the instantaneous injection quantity and acts as a quantity adjusting device.

The control slide 28 is mounted axially displaceably on the distributor piston 13, on the portion of the piston that extends in the pump interior 10. For axial displacement of the control slide 28, an electromagnetic control mechanism 29 is provided, which engages the control slide 28 via a control shaft 30 and an eccentric element 31 disposed on the face end of the control shaft 30. The control shaft 30 is rigidly connected to the armature 32 of a rotary magnet 33, so that a rotation of the armature 32 is converted via the eccentric element 31 into a displacement of the control slide 28. The rotary magnet 33 is excited via a coil 34 on a U-shaped core. The coil connections are bonded to a circuit board 35, from where an electrical connecting line, not shown, leads to the outside in a pressure-tight manner.

The electromagnetic control mechanism 29 is disposed in a control mechanism chamber 36 separate from the pump interior 10 and is secured on a control mechanism housing 37, which is flanged to the pump housing 11 and encloses the control mechanism chamber 36. The control mechanism housing 37 is embodied in two parts: a shell-like housing body 38, which is sealed off in a fluid-tight manner from the pump interior, and a cap 39 that closes the housing body 38. The cap 39 is screwed to the housing body 38 and can be removed for servicing. A ring seal 40 prevents fuel from escaping through the boundary between the housing body 38 and the cap 39. A bore 41 is provided in the housing body 38, and a bearing connector 42 that protrudes into the pump interior 10 is cast into the bore 41. The control shaft 30 is guided with radial play through the bearing connector 42, which acts as a slide bushing, creating a bearing gap between the control shaft 30 and the inner wall of the bearing connector 42; the bearing gap acts as a throttle between the pump interior 10 and the control mechanism chamber 36. Both the pump interior 10 and the control mechanism chamber 36 are connected via an overflow valve to a fuel return line connected to the fuel tank. While the overflow valve for the pump interior 10 has not been shown in the drawing, the position of the overflow valve in the control mechanism chamber is identified by reference numeral 43. It is screwed into the cap 39 and communicates via a bore 44a with an overflow opening 44, to which a fuel return line 45 leading to the fuel tank is connected. In the pump interior 10, the fuel is at a feed pressure of approximately 3 to 8 bar. Via the overflow valve there, a fuel quantity of approximately 30 liters per hour flows into the fuel tank. A pressure of approximately 0.5 bar prevails in the control mechanism chamber. Because of the pressure difference, a very small fuel quantity, approximately 30 $cm^3$ per hour, flows via the throttle interposed between elements 30 and 42 into the fuelfilled control mechanism chamber 36. A fuel quantity of the same magnitude flows via the overflow valve 43 into the fuel return line 45.

To compensate for the effect of temperature on the quantity of fuel pumped by the distributor piston 13 in its pumping stroke, a quantity that reaches the injection nozzles 25 during the compression stroke so as to be injected, an electric temperature sensor 46 is provided in the control mechanism chamber 36. With a temperature-sensitive sensor element 47, this sensor dips directly or indirectly into a permanent fuel flow diverted from the pump interior 10. The flow rate of the fuel flow should be approximately equivalent to the fuel exchange in the pump interior of approximately 30 liters per hour. The electric connecting lines of the temperature sensor 46 are extended to the circuit board 35 and bonded to it.

Figures 2, 3, 4:
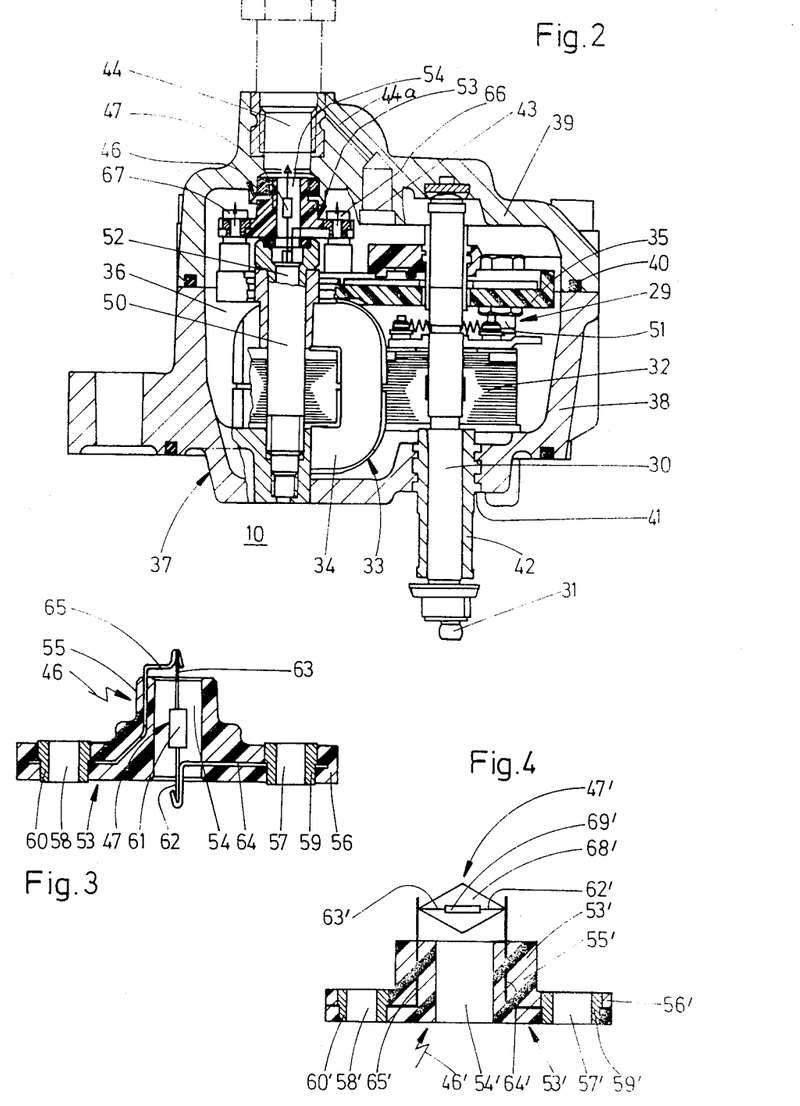
FIG. 2 is an enlarged view of the longitudinal section through the control mechanism chamber and control mechanism of the distributor fuel injection pump of FIG. 1.
FIG. 3 is an enlarged view of the longitudinal section of the temperature sensor disposed on the control mechanism of FIG. 2.
FIG. 4 is a similar enlarged longitudinal section through a temperature sensor showing a variant on the exemplary embodiment of FIG. 3, for use in the control mechanism of FIG. 2.

The control mechanism housing 37 shown in FIG. 1 along with the control mechanism chamber 36, control mechanism 29, and temperature sensor 46, is shown in longitudinal section on a larger scale in FIG. 2.

Turning now to FIG. 2, the entire control mechanism 29 is held on the housing body 38 by means of fastening screws embodied as stay bolts, of which only the fastening screws 50, 51 are visible in the drawing. The plastic circuit board 35 is mounted on the stay bolts and secured with check nuts. The fastening screw 50 protrudes with its shank end through the housing body 38 as far as the pump interior 10. It has an axial through bore 52, which emerges freely at the shank end and shank head. The temperature sensor 46 comprises a connecting piece 53 made of insulating material, which is hollow on the inside and joins the face end of the fastening screw 50 to the overflow opening 44 in the cap 39 in a pressure-tight manner. The internal cavity 54 in the connecting piece 53, along with the through bore 52, forms a flow conduit through which fuel can flow out of the pump interior 10 into the fuel return line 45. The sensor element 47 of the temperature sensor 46 is disposed in the flow conduit and thus is continuously surrounded by a flow of fuel.

In the temperature sensor 46 shown in an enlarged longitudinal section in FIG. 3, the connecting piece 53 is T-shaped and has a hollow-cylindrical part 55 and a radial ring flange 56 that is integral with the part 55. The connecting piece 53 is made of plastic. In the ring flange 56, two axial through bores 57, 58 are disposed diametrically opposite one another, and a connecting sleeve 59, 60 of electrically conductive material is inserted into each through bore 57, 58. The sensor element 47 disposed in the internal cavity 54 of the hollow-cylindrical part 55 is embodied as a negative temperature coefficient (NTC) resistor 61, which is axially oriented and protrudes with its connection ends 62, 63 out of the internal cavity 54. Each connection end 62 or 63 is soldered or welded to a respective connection lug 64 or 65. Each connection lug 64, 65 is electrically conductively connected to a respective connection sleeve 59, 60 and extends in the interior of the connecting piece 53. The two connection lugs 64, 65 begin at the connection sleeves 59, 60 and extend radially, at first, in the ring flange 56. Then, the connection lug 64 enters the internal cavity 54, and the connection lug 65 emerges at the face end, remote from the ring flange 56, of the hollow-cylindrical part 55. As FIG. 2 shows, the connecting piece 53 is secured on the circuit board 35. To this end, two assembly screws 66, 67, which at the same time effect electrical bonding, are passed through the through bores 57, 58 and screwed into suitable threaded sleeves in the circuit board 35. As they pass through the through bores 57, 58, the assembly screws 66, 67 enter into electrical contact with the connection sleeves 59, 60, thereby incorporating the NTC resistor 61 into an electrical current circuit.

In the temperature sensor 46' shown in longitudinal section in FIG. 4, which may be used instead of the temperature sensor 46 of FIG. 3 in the control mechanism of FIG. 2, the sensor element 47' is embodied as a ceramic chip 68' with a thick-film NTC resistor 69' printed onto it. The connecting piece 53', which has virtually the same shape [as in the embodiment of FIG. 3], again comprises the hollow-cylindrical part 55' and the radial ring flange 56' integral with it, and axial through bores 57', 58' lined with connection sleeves 59', 60' are again provided in the ring flange. Connection lugs 64', 65' extend from the connection sleeves 59', 60', initially radially in the ring flange 56' and then axially in the hollow-cylindrical part 55', and then protrude axially at the face end, remote from the ring flange 56', of the hollow-cylindrical part 55'. The thick-film NTC resistor 69' is soldered to these protruding ends. The temperature sensor 46' of FIG. 4 is secured to the circuit board 35 in the same manner as shown for the temperature sensor 46 in FIG. 2.

Figures 5, 6:
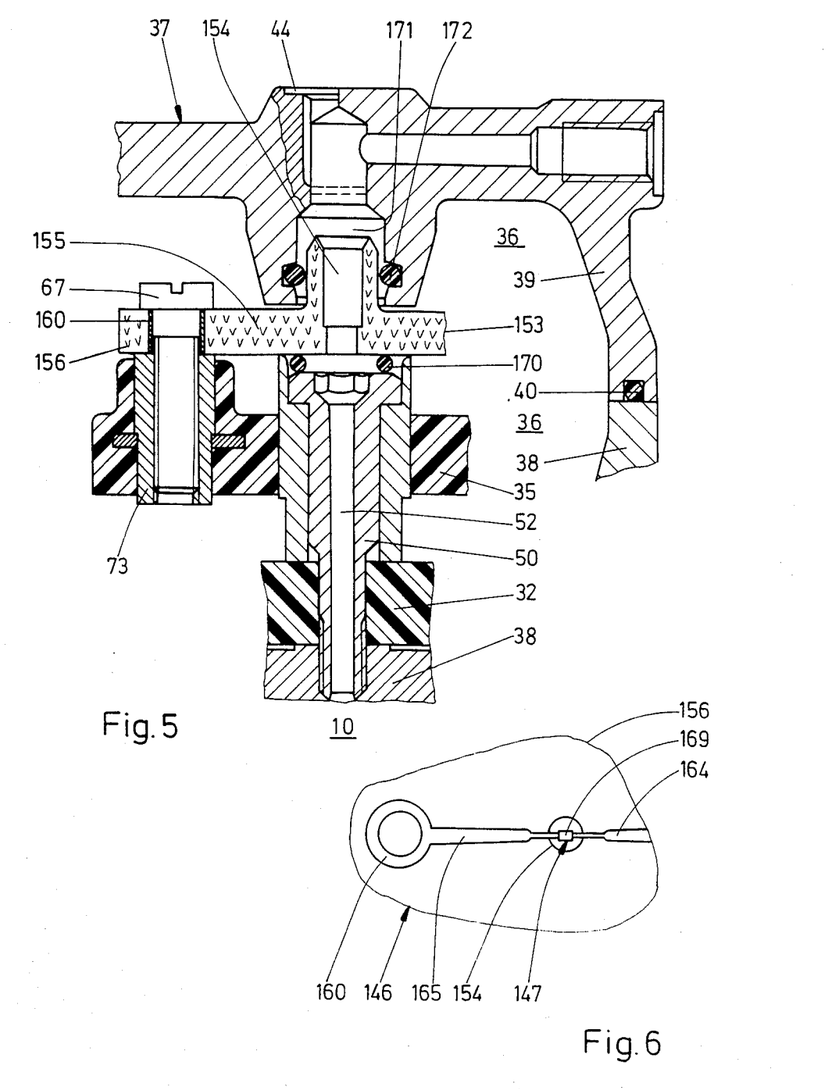
FIG. 5 is a detail of a longitudinal section through a control mechanism and temperature sensor according to a second exemplary embodiment of the invention.
FIG. 6 is a detail of a view from below of the ceramic holder of the temperature sensor of FIG. 5.

In FIG. 5, a modified control mechanism, in terms of the embodiment of the temperature sensor 146, is shown in part, in longitudinal section. The part shown approximately encompasses the region surrounding the fastening screw 50. Except for the modification to be described in detail now, the control mechanism is otherwise the same as that described in conjunction with FIG. 2, so that identical component parts, if shown, have the same reference numerals.

The connecting piece 153, here made of ceramic, of the temperature sensor 146 again covers the face end of the fastening screw 50, and a ring seal 170 assures a pressure-tight connection. With its hollow-cylindrical part 155, the ceramic connecting piece 153, which again is T-shaped, engages a blind bore 171 of stepped diameter in the cap 39 of the control mechanism housing 37. The blind bore 171 communicates with the overflow opening 44. A second ring seal 172 likewise assures a pressure-tight connection between the connecting piece 153 and the blind bore 171. In the same manner as in FIGS. 3 and 4, for securing the connecting piece 153 to the circuit board 35, axial through bores lined with connection sleeves are provided in the ring flange 156 that is integral with the hollow-cylindrical part 155. Of the two through bores and connection sleeves, only the left through bore 158 and connection sleeve 160 are visible in FIG. 5. An assembly screw is again passed through each through bore, bonding the connection sleeve by being screwed into a threaded sleeve 73 in the circuit board 35. Once again, the through bore 52 of the fastening screw 50 and the internal cavity 154 of the ceramic connecting piece 153 form a flow conduit, in which the sensor element 174 of the temperature sensor 146 is disposed, between the pump interior 10 and the overflow opening 44. As FIG. 6 shows, the sensor element 147 is embodied as a thick-film NTC resistor 169, which is applied to the end face, remote from the hollow-cylindrical part 155, of the ring flange 156 and bridges the opening of the internal cavity 154. The connection lugs 164 and 165 between the thick-film NTC resistor 169 and the two connection sleeves 60 are embodied as conductor tracks 164, 165, printed on the end face of the ring flange 156.

Figure 7:
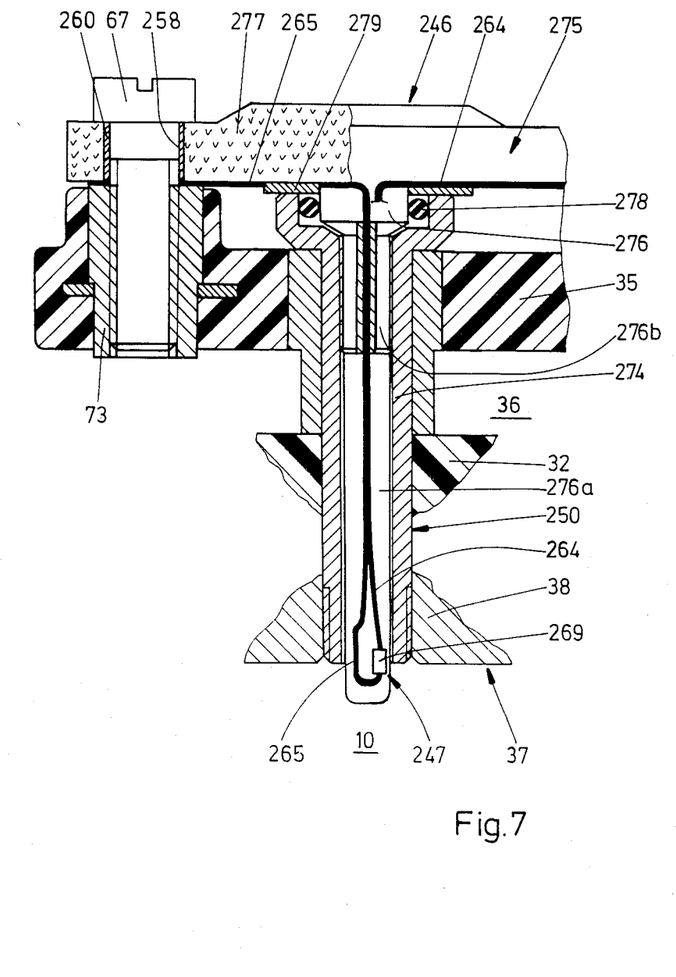
FIG. 7 is a detail of a longitudinal section through a control mechanism and temperature sensor in accordance with a third exemplary embodiment.

In the control mechanism shown in part in FIG. 7, the one fastening screw 250 securing the control mechanism to the control mechanism housing 37 is embodied as a screw sleeve 274, which with its sleeve end protrudes into the pump interior 10. The temperature sensor 246 has a ceramic holder 275 of T-shaped profile, with an axial middle part 276 and an integral crossbar 277. The middle part 276 is passed through the screw sleeve 274 and protrudes beyond the sleeve at the sleeve end. The radial crossbar 277 covers the face end of the screw sleeve 274 remote from the sleeve end, and a ring seal 278 set between the middle part 276 and the inner wall of the screw sleeve 274 assures a pressure-tight closure of the screw sleeve 274. The crossbar 277 of the ceramic holder 275 has two through bores spaced radially apart from the middle part 276, each of which is lined with an electrically conductive connection sleeve. In FIG. 7, of the two diametrically opposed through bores, only the left through bore 258 and the connection sleeve 260 inserted into it are visible. As in the temperature sensors of FIGS. 2 and 5, an assembly screw 67 simultaneously effecting bonding is passed through each through bore 258 and is screwed in a threaded sleeve 73 in the circuit board 35, in order to secure the ceramic holder 275. The sensor element 247 of the temperature sensor 246 is printed in the form of a thick-film NTC resistor 269 onto the end of the middle part 276 of the ceramic holder 275 that protrudes from the sleeve end of the screw sleeve 274. From there, printed conductor tracks 264 and 265 each lead to a respective connection sleeve 260. The conductor tracks 264, 265 initially lead to the flattened lower portion 276a of the middle part 276, then along the upper portion 276b of the middle part and finally along the underside of the crossbar 277 and surround the through bore 258. The electrical connection is effected directly to the threaded sleeve 73. To avoid electrical contact between the conductor tracks 264, 265 and the screw sleeve 274, an insulating washer 279 is disposed between the face end of the screw sleeve 274 and the underside of the crossbar 277.

Figure 8:
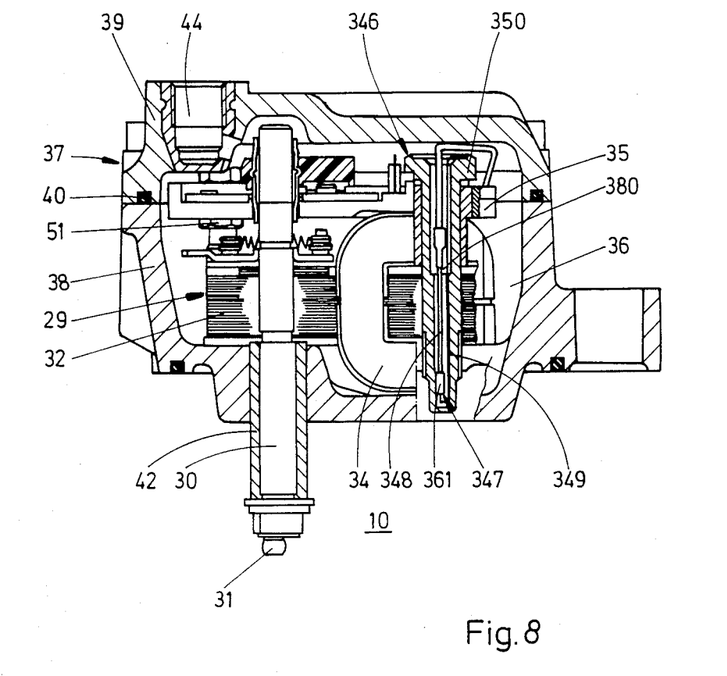
FIG. 8 is a longitudinal section through a control mechanism having a temperature sensor according to a fourth exemplary embodiment.

The control mechanism 29 shown in FIG. 8 is identical to that of FIG. 2, and so identical components have the same reference numerals. The only change is that the one fastening screw 350 is modified to receive the temperature sensor 346. In the same way as in FIG. 2, the end of the fastening screw 350 penetrates the housing body 38 of the control mechanism 37 and protrudes into the pump interior 10. The fastening screw 350 is provided with an axial blind bore 380, which discharges at the face end of the screw head and extends to near the end of the shank. The temperature sensor 346 is disposed in the blind bore 380, and the sensor element 347 is embodied as an NTC resistor 361, the connection ends 362 and 363 of which are bonded to the circuit board 35 via connection lines 348 and 349 that extend in the interior of the blind bore 380 and emerge from the fastening screw 350 at the face end. In this embodiment of the temperature sensor 346, slight errors in the temperature detection must be accepted, because the sensor element 347 does not directly experience a flow around it of the fuel in the pump interior 10; instead, the conduction of heat through the shank end must be taken into account. As in the temperature sensors described above, however, the direct bonding of the temperature sensor 347 to the circuit board 35 is retained.

Figure 9:
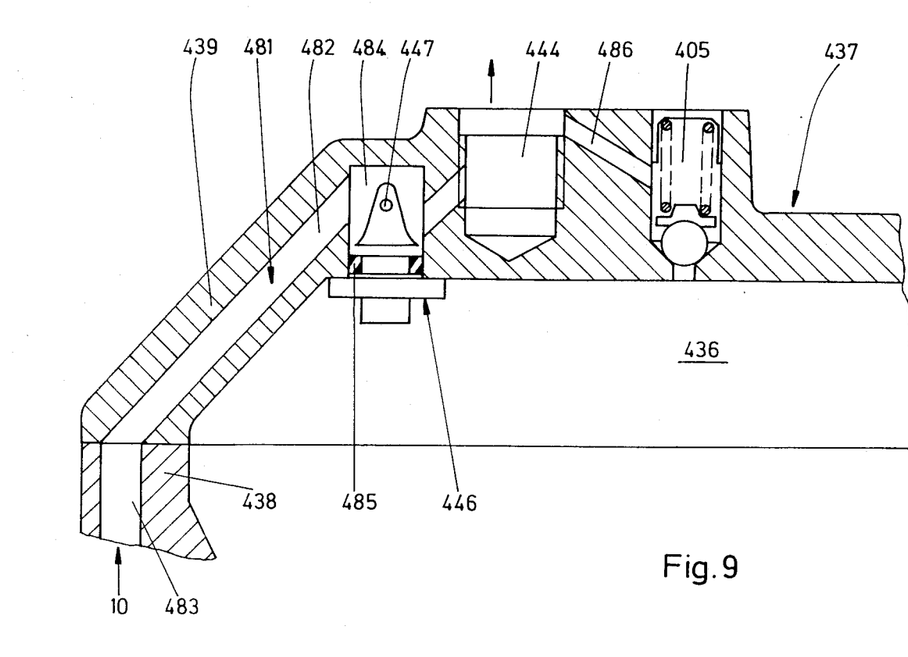
FIG. 9 is a fragmentary longitudinal section through the control mechanism housing and the temperature sensor disposed in it, in a control mechanism according to a fifth exemplary embodiment.

In the control mechanism housing 437 shown in part in FIG. 9, in which only part of the cap 439 and the housing body 438 can be seen, a flow conduit 481 for the fuel is provided, in order to attain a flow of fuel around the control mechanism chamber 436 for the sake of the temperature sensor 447. This flow conduit 481 discharges at one end into the pump interior 10 and at the other end into the overflow opening 444 disposed in the cap 439. The flow conduit 481 is composed of a bore 482, which extends in the cap 439 as far as the overflow opening 444, and a bore 483 that continues in the housing body 438 and discharges into the pump interior 10. The bore 482 extending in the cap 439 leads all the way through a receiving chamber 484, which is in the form of a blind bore beginning at the inside of the cap 439. A temperature sensor 446 is introduced into the receiving chamber 484, and its sensor element 447 is located in the fuel flow inside the receiving chamber 484. The temperature sensor 446 is embodied such that after its insertion it covers the receiving chamber 484. A ring seal 485 assures the pressure-tight sealing of the receiving chamber 484. As FIG. 9 shows, a check valve 405 is also disposed in the cap 439, communicating via a transverse bore 486 with the overflow opening 444 that is connected to the fuel return line via the overflow valve. By means of the check valve 405, the pressure in the control mechanism chamber 436 can be adjusted independently of the overflow valve communicating with the flow conduit 481.

Figure 10:
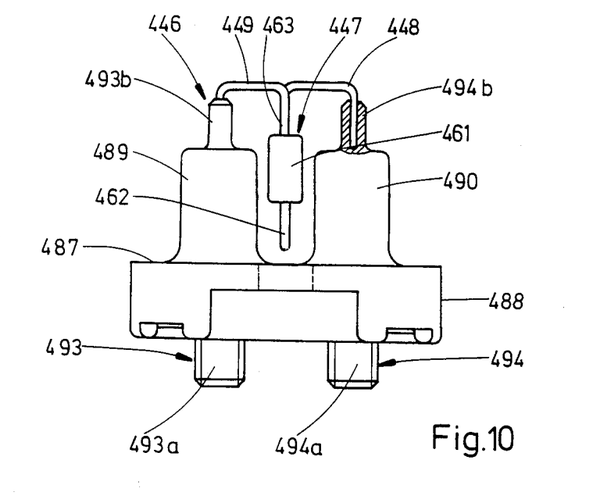
FIG. 10 is a side view of the temperature sensor in FIG. 9.
Figure 11:
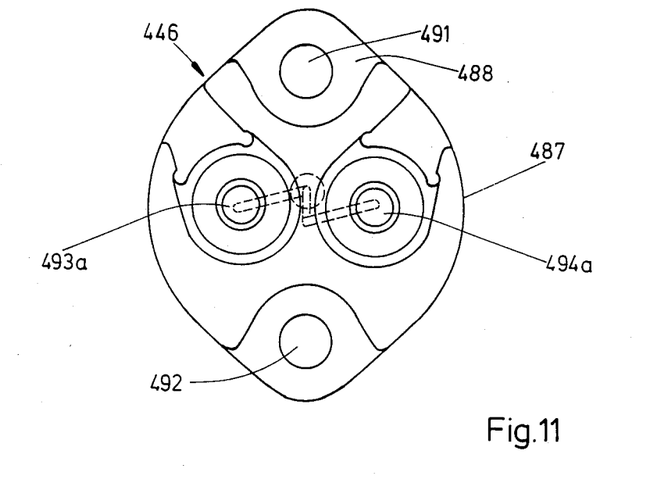
FIG. 11 is a view of the temperature sensor of FIG. 10 from below.

The structure of the temperature sensor 446 is shown in detail in FIGS. 10 and 11. It comprises a body 487 of insulating material, which has a fastening flange 488 and two protrusions 489 and 490, which are integral with the fastening flange 488 and protrude axially from it, spaced apart from each other. The fastening flange 488 has two through bores 491 and 492 (FIG. 11), through which fastening screws can be passed inorder to screw the temperature sensor 446 to the cap 439. The protrusions 489 and 490 each surround one of two contact pins 493 and 494, which axially protrude at the face end of the protrusions 489, 490, on one end, and at the face end, remote from the protrusions 489, 490, of the fastening flange 488, on the other. The latter protruding ends 493a and 494a of the contact pins 493, 494 form plug prongs for cable sockets, embodied as plug sockets, which are connected to cables (not shown) that in turn extend to the circuit board 35 of the control mechanism 29 (FIG. 1) for bonding of the temperature sensor 446. The sensor element 447 of the temperature sensor 446 is again embodied as an NTC resistor 461, which is disposed in axial alignment between the protrusions 489 and 490. The connection ends 462 and 463 of the NTC resistor are connected to connecting lines 448, 449, which are plugged into the two protruding ends 493b and 494b of the contact pins 493, 494 and there are connected to the contact pins 493, 494 electrically and mechanically, for instance by pinching or soldering.

Figure 12:
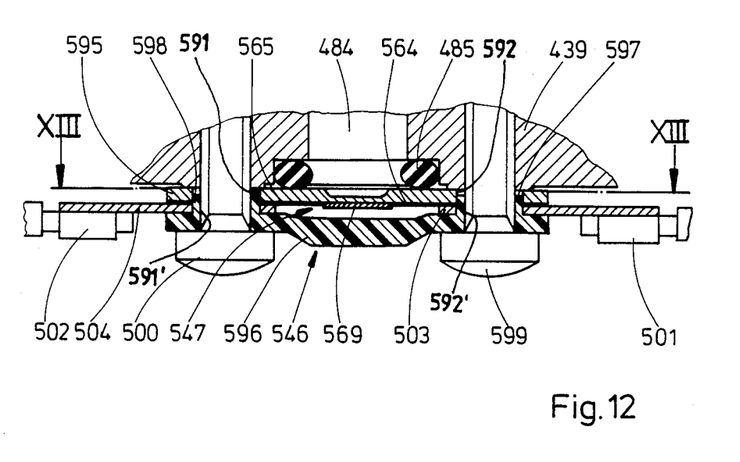
FIG. 12 is a longitudinal section through a temperature sensor showing a variant upon the FIG. 9 embodiment for use in the pump housing of FIG. 9.
Figure 13:
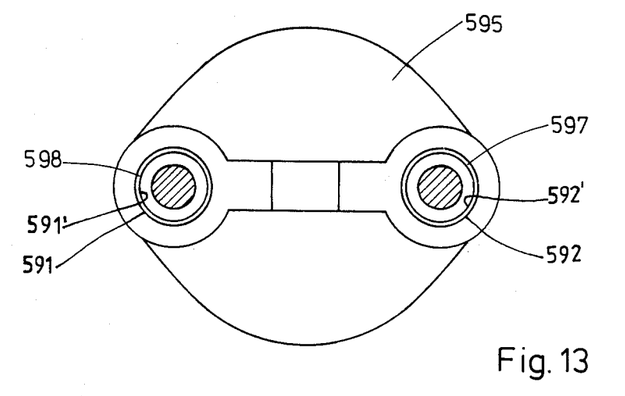
FIG. 13 is a section through the temperature sensor taken along the line XIII—XIII of FIG. 12.

Instead of the temperature sensor 446 shown in FIGS. 10 and 11, a temperature sensor 546 as shown in detail in FIGS. 12 and 13 can be inserted into the receiving chamber 484. The temperature sensor 546 shown in longitudinal section in FIG. 12 has a high-grade steel plate 595 with an enamel coating, and an insulating plate 596 that covers the coated side of the high-grade steel plate 595, spaced apart slightly from it. The high-grade steel plate 595 and the insulating plate 596 each have two through bores 591, 592 and 591', 592', respectively, and the respective through bores of the two plates are in alignment with one another; that is, the through bores 591 and 591' are aligned with one another, and the through bores 592 and 592' are in alignment with one another. The through bores 591', 592' in the insulating plate 596 are each surrounded by a respective cylindrical protrusion 597 and 598, which protrudes into the associated through bore 591 or 592 in the high-grade steel plate 595. Fastening screws 599 and 500 are inserted through the aligned through bores 591, 591' and 592, 592', and with them the temperature sensor 546 is secured to the cap 439 of the control mechanism housing 437 (FIG. 9) in such a way that the high-grade steel plate 595 covers the opening of the receiving chamber 484. The ring seal 485 again assures a pressure-tight closure of the receiving chamber 484. The sensor element 547 of the temperature sensor 546 is applied as a thick-film NTC resistor 569 to the enameled side of the high-grade steel plate 595, in the region where the receiving chamber 484 is covered by the high-grade steel plate 595. The thick-film resistor 569 is connected to two conductor tracks 564, 565 made of gold resinate, extending on the enamel coating. These conductor tracks 564 and 565 extend around the through bores 591 and 592 in the plate high-grade steel 595. Two cable sockets each, 501 and 502, are fastened between the high-grade steel plate 595 and the insulating plate 596 and with eyelets 503 and 504 they engage the protrusions 597 and 598 on the insulating plate 596. By means of the fastening screws 599 and 500, the cable sockets 501 and 502 are pressed with their eyelets 503 and 504 against the conductor tracks 564, 565 and electrically bonded to them. The connecting lines, not shown, that are connected to the cable sockets 501 and 502 again extend to the circuit board 35 of the control mechanism 29 (FIG. 1), so that once again the temperature sensor 546 is bonded to the circuit board 35.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A fuel injection pump for internal combustion engines having a pump interior, a pump housing therefor provided with a pump work chamber, a quantity adjusting device disposed in said pump interior for controlling the fuel injection quantity pump at high pressure by a pump piston, a control mechanism chamber separate from said pump interior and arranged to communicate therewith via a fuel flow throttle restriction, said control mechanism chamber also being arranged to communicate via an overflow valve with a fuel return line leading to a fuel tank, an electric control mechanism disposed in said control mechanism chamber adapted to actuate the quantity adjusting device, said electrical control mechanism having connections electrically secured on a circuit board in said control mechanism chamber, said control mechanism chamber (36; 436) further including an electric temperature sensor (46; 146; 246; 346; 446; 546) having a temperature-sensitive sensor element (47; 147; 247; 347; 447; 547) which at least with its sensor element (47–547) dips into a fuel flow means which permanently diverts fuel from the pump interior (10) into said control mechanism chamber, and further that said temperature sensor (46–546) has electric connecting leads which extend to said circuit board (35) and are secured electrically thereto.

2. A pump as defined by claim 1, in which the control mechanism (29) is held by means of fastening screws (50, 51) on said pump housing (11), preferably on a control mechanism housing (37) which encloses the control mechanism chamber (36) and includes the overflow opening (44); further that one of said fastening screws (50–51) protrudes with its shank end into the pump interior (10) and has an axial through bore (52); further that the temperature sensor (46; 46'; 146) has a hollow connecting piece (53; 53'; 153) adapted to be disposed in a pressure-tight manner between the face end of said screw head and the overflow opening (44), further that the internal cavity (54; 54'; 154) of the connecting piece is adapted to form, with the axial through bore (52), a flow conduit, for the fuel; and that said sensor element (47; 47'; 147) of said temperature sensor (46; 46'; 146) is disposed in said flow conduit.

3. A pump as defined by claim 2, in which said overflow opening (44), connecting piece (53; 53'; 153) and hollow fastening screw (50) are in axial alignment; further that the connecting piece (53; 53'; 153) is embodied as approximately T-shaped in profile and has a hollow-cylindrical part (55; 55'; 155) and a radial ring flange (56; 56'; 156) integral therewith, said ring flange further including axial through bores (57, 58; 57', 58'; 158) and further that the connecting piece (53; 53'; 153) is secured to the circuit board (35) by means of two assembly screws (66, 67) which pass through said through bores (57, 58; 57', 58'; 158).

4. A pump as defined by claim 3, in which electrically conductive connecting sleeves (59, 60; 59', 60'; 160) are inserted into said through bores (57, 58; 57', 58'; 158), said sleeves are further connected to lugs (64, 65; 64', 65; 164, 165) for said sensor element (47; 47'; 147) and wherein said sleeves are in contact with the assembly screws (66, 67) which at the same time serve to effect electrical bonding.

5. A pump as defined by claim 2, in which the connecting piece (53) comprises an insulating material; further that said lugs (64, 65) extend interiorly within the ring flange (56), one of said lugs emerging in an internal cavity (54) and the other of said lugs emerging at an end face of the hollow-cylindrical part (55) and further that one each of said lugs is secured electrically to an opposite connection end (62, 63) of an axially aligned NTC resistor (61) which comprises the sensor element (47).

6. A pump as defined by claim 3, in which the connecting piece (53) comprises an insulating material; further that said lugs (64, 65) extend interiorly within the ring flange (56), one of said lugs emerging in an internal cavity (54) and the other of said lugs emerging at an end face of the hollow-cylindrical part (55) and further that one each of said lugs is secured electrically to an opposite connection end (62, 63) of an axially aligned NTC resistor (61) which comprises the sensor element (47).

7. A pump as defined by claim 4, in which the connecting piece (53) comprises an insulating material; further that said lugs (64, 65) extend interiorly within the ring flange (56), one of said lugs emerging in an internal cavity (54) and the other of said lugs emerging at an end face of the hollow-cylindrical part (55) and further that one each of said lugs is secured electrically to an opposite connection end (62, 63) of an axially aligned NTC resistor (61) which comprises the sensor element (47).

8. A pump as defined by claim 2, in which said connecting piece (53') comprises insulating material; further that said lugs (64', 65') extend in the interior of the insulating body, initially radially in the ring flange (56') and then axially in the hollow-cylindrical part (55') and thereafter protrude axially on a face end of the hollow-cylindrical part (55'), preferably on the face end remote from the ring flange (56'); and further that the sensor element (47') comprises a thick-film NTC resistor (69') disposed on a ceramic chip (68'), and the connection ends (62', 63') of the resistor, embodied as conductor tracks, are connected to the protruding ends of said lugs (64', 65').

9. A pump as defined by claim 3, in which said connecting piece (53') comprises insulating material; further that said lugs (64', 65') extend in the interior of the insulating body, initially radially in the ring flange (56') and then axially in the hollow-cylindrical part (55') and thereafter protrude axially on a face end of the hollow-cylindrical part (55'), preferably on the face end remote from the ring flange (56'); and further that the sensor element (47') comprises a thick-film NTC resistor (69') disposed on a ceramic chip (68'), and the connection ends (62', 63') of the resistor, embodied as conductor tracks, are connected to the protruding ends of said lugs (64', 65').

10. A pump as defined by claim 4, in which said connecting piece (53') comprises insulating material; further that said lugs (64', 65') extend in the interior of the insulating body, initially radially in the ring flange (56') and then axially in the hollow-cylindrical part (55') and thereafter protrude axially on a face end of the hollow-cylindrical part (55'), preferably on the face end remote from the ring flange (56'); and further that the sensor element (47') comprises a thick-film NTC resistor (69')

disposed on a ceramic chip (68'), and the connection ends (62', 63') of the resistor, embodied as conductor tracks, are connected to the protruding ends of said lugs (64', 65').

11. A pump as defined by claim 2, in which said connecting piece (153) comprises a ceramic body and that on the end face, remote from the hollow-cylindrical part (155), of the radial ring flange (156), the lugs (164, 165) comprise radially extending conductor tracks, and further that the sensor element (147) is applied as a thick-film resistor (169) which is adapted to bridge an opening of the axial through bore (52) of the fastening screw (50).

12. A pump as defined by claim 3, in which said connecting piece (153) comprises a ceramic body and that on the end face, remote from the hollow-cylindrical part (155), of the radial ring flange (156), the lugs (164, 165) comprise radially extending conductor tracks, and further that the sensor element (147) is applied as a thick-film resistor (169) which is adapted to bridge an opening of the axial through bore (52) of the fastening screw (50).

13. A pump as defined by claim 4, in which said connecting piece (153) comprises a ceramic body and that on the end face, remote from the hollow-cylindrical part (155), of the radial ring flange (156), the tugs (164, 165) comprise radially extending conductor tracks, and further that the sensor element (147) is applied as a thick-film resistor (169) which is adapted to bridge an opening of the axial through bore (52) of the fastening screw (50).

14. A pump as defined by claim 1, in which the control mechanism (29) is held by means of fastening screws on the pump housing (11), preferably on a control mechanism housing (37) enclosing the control mechanism chamber (36); that one of the fastening screws (250) comprises a screw sleeve (274) protruding with its sleeve end into the pump interior (10); the temperature sensor (246) being provided with a ceramic holder (275) of T-shaped profile having an axial medial portion (276) extending in the screw sleeve (274) to protrude axially at the sleeve end and further having a radial crossbar (277) encompassing the sleeve head in a pressure-tight manner; two axial through bores (258) being provided in the crossbar (277); the ceramic holder (275) being secured to the circuit board (35) by means of two assembly screws (67) each respectively passing through one of the through bores (258); the through bores (258) being each lined with an electrically conductive connection sleeve (260) adapted to contact the assembly screw (67) to simultaneously effect an electrical bonding therebetween; the connection sleeves (26) being connected to the sensor element (247); and the sensor element (247) is printed as a thick-film resistor (269) onto the medial portion, protruding from the screw sleeve (274), of the ceramic body (275), and the lugs (264, 265) are printed in the form of conductor tracks onto the cross-bar (277) and said medial portion (276).

15. A pump as defined by claim 1, in which the control mechanism (29) is held by means of fastening screws (350; 351) on the pump housing (11), preferably on a control mechanism housing (37) enclosing the control mechanism chamber (36); one of the fastening screws (350) protrudes via a shank end into the pump interior (10) and has an axial blind bore (380) discharging on a face end of the head of the fastening screw, said blind bore extending substantially as far inside the shank end that protrudes into the pump interior (10); and the temperature sensor (346) is disposed in the blind bore (380) with its sensor element (347) located on or near the blind bore bottom and preferably being embodied as an NTC resistor (361).

16. A pump as defined by claim 15, in which the control chamber mechanism (436) is enclosed by a control mechanism housing (437) flanged to the pump housing (11) and including an overflow opening (444); the control mechanism housing (437) is penetrated by a bore (482, 483), which discharges at one end into the pump interior (10) and at the other end into the overflow opening (444); and the bore (482, 483) extends through a receiving chamber (484), disposed in the control mechanism housing (437), for the temperature sensor (446), which receiving chamber is open toward the control mechanism housing (436) and is sealed off upon the insertion of the temperature sensor (446).

17. A pump as defined by claim 16, in which the control mechanism housing (437) comprises two parts, a housing body (438) and a cap (439) detachable therefrom, and that the overflow opening (444) and the receiving chamber (484) for the temperature sensor (446) are disposed in the cap (439).

18. A pump as defined by claim 8, in which the sensor element (447) is provided with a body (487) of insulating material with a fastening flange (488) through which two axial through bores (491, 492) for assembly screws are provided, said body being provided with two protrusions (489, 490) offstanding axially from the fastening flange (488) and disposed axially spaced apart from one another enclosing contact pins (493, 494) protruding therefrom, said body further provided with first protrusion portions (493, 494) protruding in oppositely directed relation at the other end from the face end of the fastening flange (488), the sensor element (447) comprising an NTC resistor (461) disposed in axial alignment between the protrusions (489, 490), the connections (462, 463, 448, 449) for which are inserted into two second protrusion portions (493b, 494b) of the contact pins (493, 494) extending from the protrusions (489, 490) and are secured there, for instance by being soldered or pinched.

19. A pump as defined by claim 9, in which the sensor element (447) is provided with a body (487) of insulating material with a fastening flange (488) through which two axial through bores (491, 492) for assembly screws are provided, said body being provided with two protrusions (489, 490) offstanding axially from the fastening flange (488) and disposed axially spaced apart from one another enclosing contact pins (493, 494) protruding therefrom, said body further provided with first protrusion portions (493, 494) protruding in oppositely directed relation at the other end from the face end of the fastening flange (488), the sensor element (447) comprising an NTC resistor (461) disposed in axial alignment between the protrusions (489, 490), the connections (462, 463, 448, 449) for which are inserted into two second protrusion portions (493b, 494b) of the contact pins (493, 494) extending from the protrusions (489, 490) and are secured there, for instance by being soldered or pinched.

20. A pump as defined by claim 10, in which the first protrusion portions (493a, 494a) of the contact pins (493, 494) which protrude from the fastening flange (488) comprise plug prongs for electric connecting cables that are provided with complemental plug sockets leading to the circuit board.

21. A pump as defined by claim 16, in which the temperature sensor (546) comprises a high-grade steel plate (595) provided with an enamel coating and an insulating plate (596) adapted to cover the high-grade steel plate (595) and disposed so as to be spaced slightly apart from it; the two steel plates (595, 596) are provided with through bores (591, 592, 591', 592') coaxial to one another for securing same to an inner wall of the control mechanism housing (437) with fastening screws (599, 500) so as to cover an opening in a receiving chamber (484), said fastening screws extending through the through bores (591, 592) in the high-grade steel plate (595) without contacting said bores, said sensor element (547) being disposed as a thick-film NTC resistor (569) on the enamel coating remote from the receiving chamber (484) in the vicinity of the opening of the receiving chamber (484) and being connected to two conductor tracks (564, 565), preferably of gold resinate, extending on the enamel coating, each track leading to one through opening (591, 592) in the high-grade steel plate (595); and two eyelet-like cable sockets (501, 502) connected to electrical connection cables leading to the circuit board (35) are fastened by means of said fastening screws (599, 500), said fastening screws extending in an insulated manner through the high-grade steel plate (595) and the insulating plate (596), each socket being adapted to bond to one of the conductor tracks (564, 565).

* * * * *